(12) United States Patent
Yoshizawa et al.

(10) Patent No.: US 9,109,633 B2
(45) Date of Patent: Aug. 18, 2015

(54) DRIVING FORCE TRANSMISSION MECHANISM AND IMAGE FORMING APPARATUS

(75) Inventors: Hideo Yoshizawa, Kanagawa (JP); Kiyonori Tsuda, Kanagawa (JP); Takuzi Yoneda, Tokyo (JP); Yutaka Takahashi, Kanagawa (JP); Emi Kita, Kanagawa (JP); Yuki Oshikawa, Kanagawa (JP); Kohichi Utsunomiya, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 542 days.

(21) Appl. No.: 13/398,063

(22) Filed: Feb. 16, 2012

(65) Prior Publication Data

US 2012/0230738 A1    Sep. 13, 2012

(30) Foreign Application Priority Data

Mar. 10, 2011 (JP) ................. 2011-053034

(51) Int. Cl.
   *G03G 15/08* (2006.01)
   *G03G 15/00* (2006.01)
   *F16D 1/10* (2006.01)
   *F16D 3/223* (2011.01)

(52) U.S. Cl.
   CPC .......... *F16D 1/101* (2013.01); *F16D 2001/102* (2013.01); *F16D 2003/22326* (2013.01)

(58) Field of Classification Search
   USPC ................................ 399/279, 167
   See application file for complete search history.

(56) References Cited

U.S. PATENT DOCUMENTS

| 3,584,667 A | 6/1971 | Reiland |
| 6,163,665 A | 12/2000 | Watanabe et al. |
| 6,175,706 B1 | 1/2001 | Watanabe et al. |
| 6,795,673 B2 | 9/2004 | Yoshizawa |
| 7,212,773 B2 | 5/2007 | Sudo et al |

(Continued)

FOREIGN PATENT DOCUMENTS

| AT | 507 599 A1 | 6/2010 |
| CN | 1179559 A | 4/1998 |

(Continued)

OTHER PUBLICATIONS

The Extended European Search Report issued Jun. 6, 2012, in Application No. / Patent No. 12157139.2-2423.

(Continued)

*Primary Examiner* — Rodney Bonnette
(74) *Attorney, Agent, or Firm* — Oblon, Spivak, McClelland, Maier & Neustadt, L.L.P.

(57) ABSTRACT

A driving force transmission mechanism includes a connection for integrally rotating a driving shaft on the driving source side and a driven shaft of a rotary member. The connection includes a tubular boss portion; and a fitting shaft portion fitted into the tubular boss portion. An inner shaft portion is provided in a projecting manner from bottom center of the tubular boss portion toward inside the tubular boss portion. An inner recessed portion into which the inner shaft portion fits is provided in center of a leading edge plane for fitting of the fitting shaft portion. Micro gaps are provided between an inner surface of the tubular boss portion and an outer surface of the fitting shaft portion and between an inner surface of the inner recessed portion and an outer surface of the inner shaft portion.

10 Claims, 9 Drawing Sheets

(56) References Cited

U.S. PATENT DOCUMENTS

| | | |
|---|---|---|
| 2005/0088036 A1 | 4/2005 | Myers et al. |
| 2006/0204275 A1* | 9/2006 | Patton et al. .................. 399/110 |
| 2009/0196655 A1* | 8/2009 | Takigawa et al. ............. 399/167 |
| 2010/0303501 A1* | 12/2010 | Tsui ............................... 399/167 |

FOREIGN PATENT DOCUMENTS

| | | |
|---|---|---|
| CN | 1102250 C | 2/2003 |
| DE | 10 2008 056 058 A1 | 2/2010 |
| EP | 1 921 247 A1 | 5/2008 |
| JP | 2002-372829 | 12/2002 |
| JP | 2009-24829 | 2/2009 |
| JP | 2009-30645 | 2/2009 |
| JP | 2009-30646 | 2/2009 |
| JP | 2009-41640 | 2/2009 |
| JP | 2009-58735 | 3/2009 |
| JP | 2009-069556 | 4/2009 |
| JP | 2010-43665 | 2/2010 |
| JP | 2010-121740 | 6/2010 |

OTHER PUBLICATIONS

Combined Office Action and Search Report issued on Jan. 6, 2014, in Chinese Patent Application No. 201210058198.X (with English translation).

Office Action issued Sep. 22, 2014 in Japanese Patent Application No. 2011-053034.

* cited by examiner

DRIVING FORCE TRANSMISSION MECHANISM AND IMAGE FORMING APPARATUS

CROSS-REFERENCE TO RELATED APPLICATIONS

The present application claims priority to and incorporates by reference the entire contents of Japanese Patent Application No. 2011-053034 filed in Japan on Mar. 10, 2011.

BACKGROUND OF THE INVENTION

1. Field of the Invention

The present invention relates to a driving force transmission mechanism and an image forming apparatus.

2. Description of the Related Art

Recently, along with the improvement of image quality and speed in an image forming apparatus, if any rotary member included in a photosensitive element, a developing unit, a transfer unit, or the like has rotational fluctuation, uneven density in an image tends to occur. Therefore, rotational accuracy of such a rotating member, in particular, a shaft of a developing roller, which has the greatest impact on image quality, is strictly required.

As conventional art, there has been proposed that an output shaft (a driving shaft) on a driving source side is coupled to an input shaft (a driven shaft, which is a rotational driving force receiving part) on a developing unit side by using a triball-type constant velocity joint (for example, Japanese Patent Application Laid-open No. 2009-24829, Japanese Patent Application Laid-open No. 2009-30646, Japanese Patent Application Laid-open No. 2009-30645, Japanese Patent Application Laid-open No. 2009-41640, and Japanese Patent Application Laid-open No. 2010-121740). By using the triball-type constant velocity joint, the driven shaft on the developing unit side (the rotational driving force receiving part) can be rotated at the same speed as that of the driving shaft on the driving source side even if a deflection angle is generated therebetween, thereby forming a high quality image without defects such as uneven density.

When the triball-type constant velocity joint is used as described above; however, the following problems occur as illustrated in FIGS. 11A and 11B. In an image forming apparatus in which a constant velocity joint 100 is used, a tubular portion 101a is provided so as to project from a bottom wall 10b of a joint outer ring 101, while a shaft end portion 102a of a driven shaft 102 fits into the tubular portion 101a as illustrated in FIG. 11A.

In order to integrally rotate the outer ring 101 of the constant velocity joint 100 and the driven shaft 102, a flat surface 103 is provided on an inner diameter surface of the tubular portion 101a, while a flat surface 104 corresponding to the flat surface 103 is provided on an outer diameter surface of the shaft end portion 102a.

Furthermore, in order to fit the shaft end portion 102a into the tubular portion 101a, a micro gap A needs to be provided between the inner diameter surface of the tubular portion 101a and the outer diameter surface of the shaft end portion 102a. However, such a micro gap A generates a so-called fitting backlash, which causes an inclination (i.e., shaft misalignment) B between the driven shaft 102 and the outer ring 101 of the constant velocity joint 100 as illustrated in FIG. 11B. Such shaft misalignment in turn generates banding on an image due to pitch variation.

Therefore, there are needs for a driving force transmission mechanism that causes no shaft misalignment, whereby rotational driving force from the driving source is stably transmitted to the driven shaft, and an image forming apparatus that can form a high quality image using the driving force transmission mechanism.

SUMMARY OF THE INVENTION

According to an embodiment, there is provided a driving force transmission mechanism that transmits rotational driving force from a driving source to a rotary member. The driving force transmission mechanism includes a connection for integrally rotating a driving shaft on the driving source side and a driven shaft of the rotary member. The connection includes a tubular boss portion; and a fitting shaft portion fitted into the tubular boss portion. An inner shaft portion is provided in a projecting manner from bottom center of the tubular boss portion toward inside the tubular boss portion. An inner recessed portion into which the inner shaft portion fits is provided in center of a leading edge plane for fitting of the fitting shaft portion. Micro gaps are provided between an inner surface of the tubular boss portion and an outer surface of the fitting shaft portion and between an inner surface of the inner recessed portion and an outer surface of the inner shaft portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An image forming apparatus of an embodiment of the present invention will be described below with reference to the accompanying drawings.

First Embodiment

Figure 4:
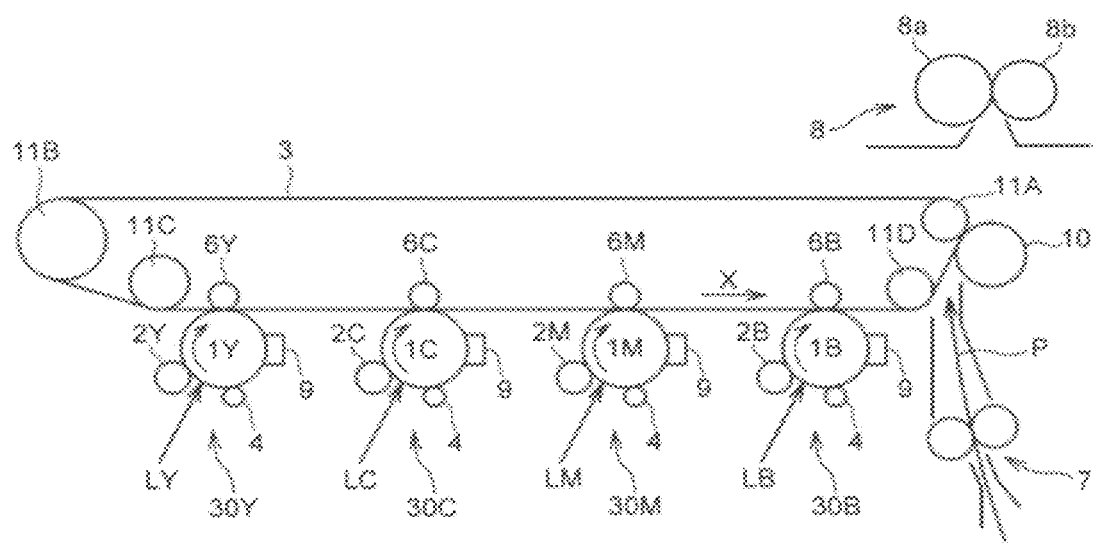
FIG. 4 is a schematic overall view of an image forming apparatus of the present invention.
Figure 5:
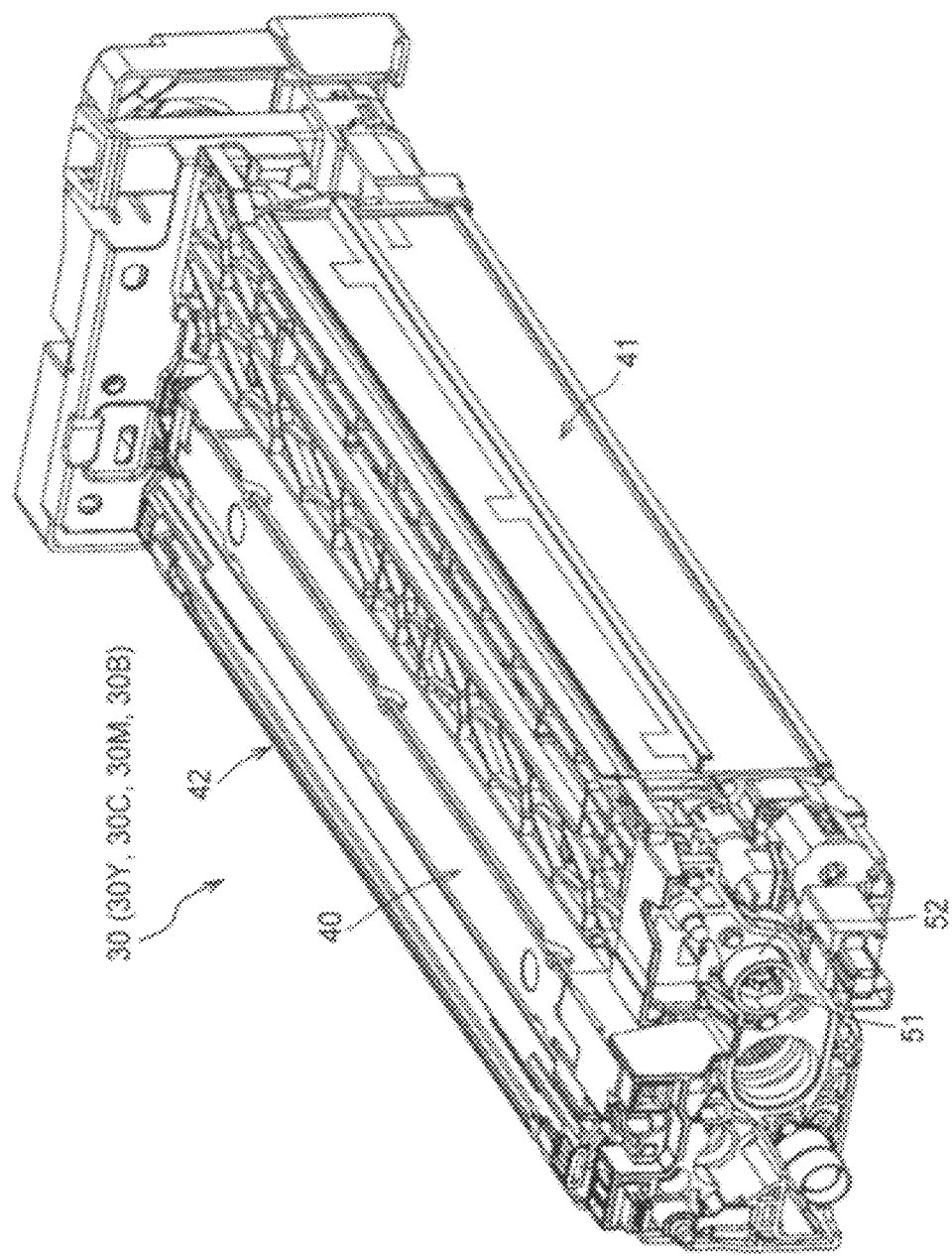
FIG. 5 is a perspective view of a process cartridge of the present invention.
Figure 6:
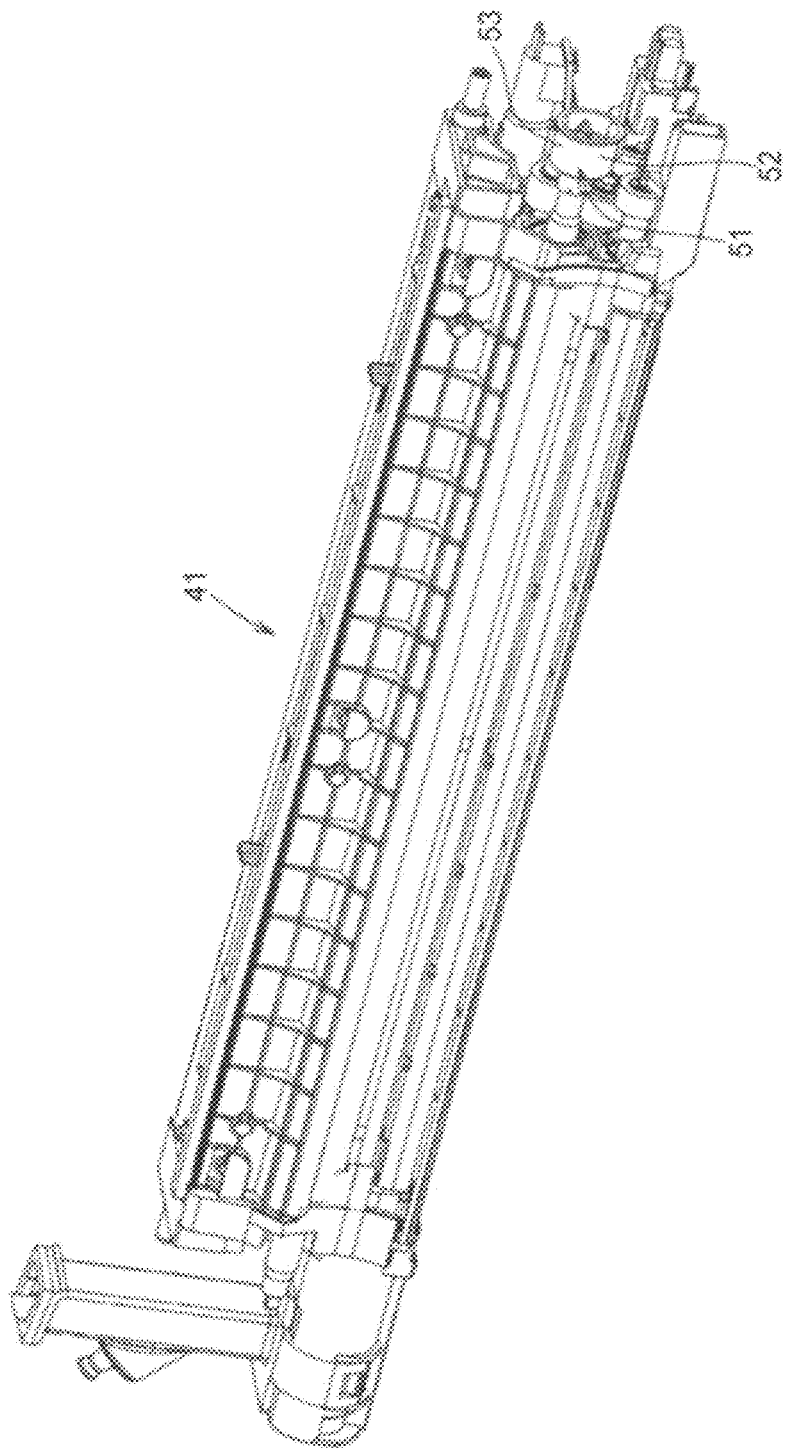
FIG. 6 is a perspective view of a developing unit of the process cartridge of the present invention.
Figure 7:
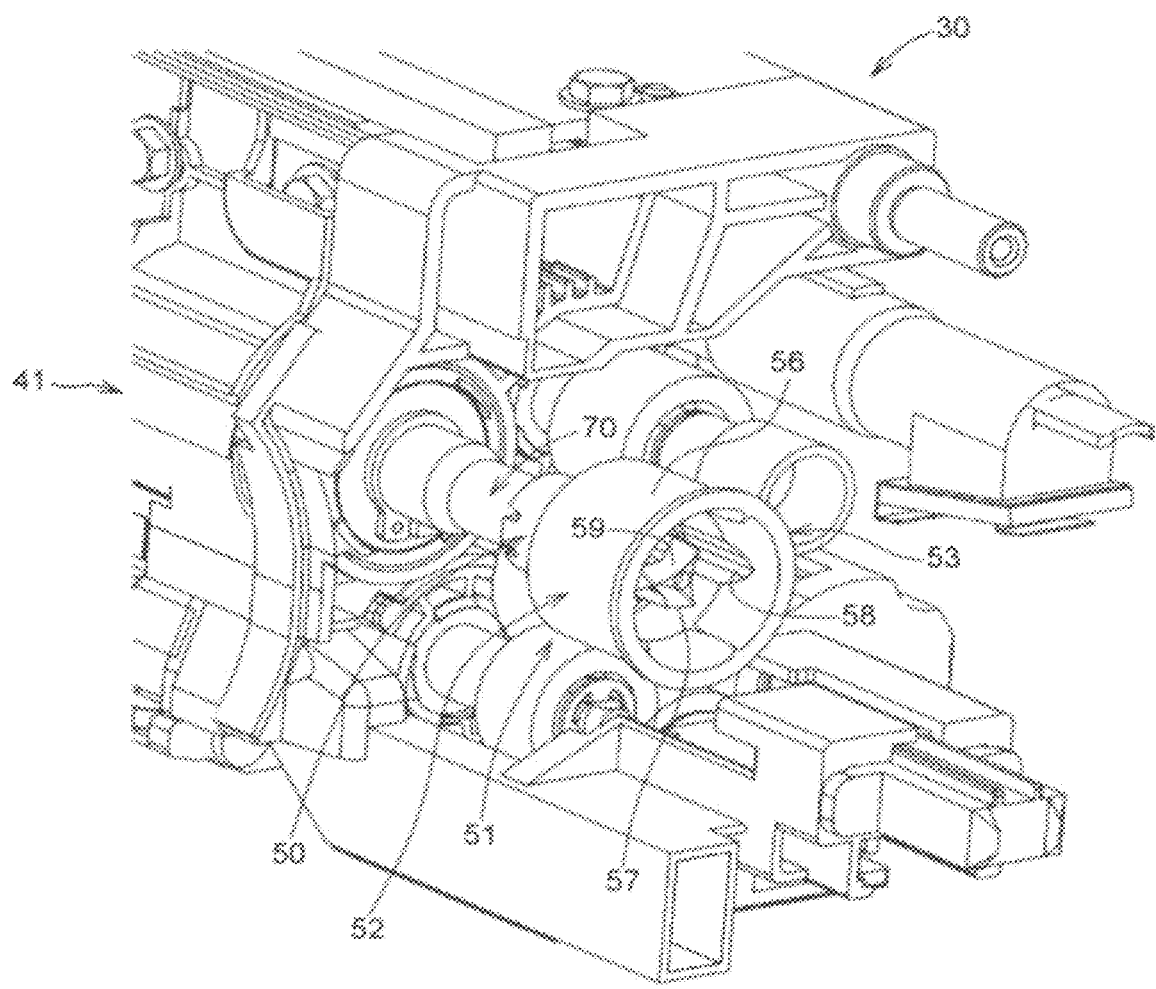
FIG. 7 is an enlarged perspective view of relevant portions of the developing unit.

FIG. 4 is a schematic cross sectional view illustrating a structure of relevant portions of an image forming apparatus according to the embodiment. FIG. 5 is a perspective view of a process cartridge used for the image forming apparatus illustrated in FIG. 4. The image forming apparatus is a so-called "tandem" type image forming apparatus in which photosensitive elements 1Y, 1C, 1M, and 1B each of which is a drum-shaped image carrier are arranged in line in a moving direction (illustrated with an arrow X) of an endless intermediate transfer belt 3 on which toner images of yellow (Y), cyan (C), magenta (M), and black (B) formed on the photosensitive elements 1Y, 1C, 1M, and 1B are transferred and superimposed to form a color image.

The image forming apparatus includes the photosensitive elements 1Y, 1C, 1M, and 1B, and around them, roller charging devices 4 uniformly charging each surface of the photosensitive elements 1Y, 1C, 1M, and 1B, developing units 2Y, 2C, 2M, and 2B supplying toner to electrostatic latent images formed on the photosensitive elements 1Y, 1C, 1M, and 1B to form toner images, and cleaning devices 9 removing remaining toner from the photosensitive elements 1Y, 1C, 1M, and 1B after primary transfer rollers 6Y, 6C, 6M, and 6B superimpose toner images on the photosensitive elements 1Y, 1C, 1M, and 1B to transfer the toner images onto the intermediate transfer belt 3. Each of the roller charging devices 4, each of the developing units 2Y, 2C, 2M, and 2B, and each of the cleaning devices 9 are arranged around and coupled integrally to the respective photosensitive elements 1Y, 1C, 1M, and 1B to constitute process cartridges 30Y, 30C, 30M, and 30B forming toner images of yellow (Y), cyan (C), magenta (M), and black (B), respectively.

The process cartridges 30Y, 30C, 30M, and 30B can be removed from and installed in predetermined positions in the image forming apparatus. Therefore, each of the process cartridges 30Y, 30C, 30M, and 30B can be easily and surely replaced with new ones, while maintaining positional relationship accurately with the respective photosensitive elements 1Y, 1C, 1M, and 1B, the respective roller charging devices 4, the respective developing units 2Y, 2C, 2M, and 2B, and the respective cleaning devices 9. More specifically, each of the process cartridges 30Y, 30C, 30M, and 30B can be a unit body including a charging unit 40 provided with the roller charging device 4, a developing unit 41 provided with a corresponding one of the developing units 2Y, 2C, 2M, and 2B, and a cleaning unit 42 provided with the cleaning device 9, as illustrated in FIG. 5.

Each of the process cartridges 30Y, 30C, 30M, and 30B is not limited to one in which each of the roller charging devices 4, each of the developing units 2Y, 2C, 2M, and 2B, and each of the cleaning devices 9 are all coupled to a corresponding one of the photosensitive elements 1Y, 1C, 1M, and 1B integrally. Instead, one in which at least the photosensitive elements 1Y, 1C, 1M, and 1B and the respective developing units 2Y, 2C, 2M, 2B, are integrally coupled, respectively, suffices.

A method of forming an image using the image forming apparatus with the above-described structure will now be described. The photosensitive elements 1Y, 1C, 1M, and 1B are rotated in the direction illustrated with the arrows. Outer circumference surfaces 1a of the photosensitive elements 1Y, 1C, 1M, and 1B being rotated are uniformly charged by the roller charging devices 4. The outer circumference surfaces 1a of the photosensitive elements 1Y, 1C, 1M, and 1B thus charged are irradiated with exposure beams of respective colors LY, LC, LM, and LB from a writing unit (not illustrated) to form electrostatic latent images corresponding to respective colors. The electrostatic latent images thus formed on the photosensitive elements 1Y, 1C, 1M, and 1B are supplied with toner of the respective colors from the developing units 2Y, 2C, 2M, and 2B to form respective color toner images on the photosensitive elements 1Y, 1C, 1M, and 1B.

The respective color toner images formed on the photosensitive elements 1Y, 1C, 1M, and 1B are transferred and superimposed on the intermediate transfer belt 3 sequentially by applying a transfer bias voltage to the primary transfer rollers 6Y, 6C, 6M, and 6B to form color toner images. The color toner images thus formed on the intermediate transfer belt 3 are transferred to a transfer material P such as a transfer sheet conveyed at appropriate operational timing from a pair of registration rollers 7 by a secondary transfer roller 10. The color toner images transferred on the transfer material P are then heated and pressed by a fixing unit 8 including a heating roller 8a and a pressing roller 8b, thereby being fixed on the transfer material P and ejected from the apparatus.

Remaining toner on the outer circumference surfaces of the photosensitive elements 1Y, 1C, 1M, and 1B from which respective color toner images are transferred to the intermediate transfer belt 3 is removed by the cleaning devices 9. Each of the outer circumference surfaces 1a is uniformly charged by the roller charging device 4 again to be ready for a subsequent image forming process.

The tandem-type color image forming apparatus is described in the embodiment. The present invention, however, can be also applied to a monochrome image forming apparatus including a process cartridge 30B having black toner only for black images. In the embodiment described above, the intermediate transfer belt 3 is used as a transferred material on which respective color toner images from the photosensitive elements 1Y, 1C, 1M, and 1B are transferred. Alternatively, the transfer material P may be used for a transferred material on which respective color toner images from the photosensitive elements 1Y, 1C, 1M, and 1B are directly transferred and superimposed by conveying the transfer material P using an endless carriage belt.

Figure 1A:
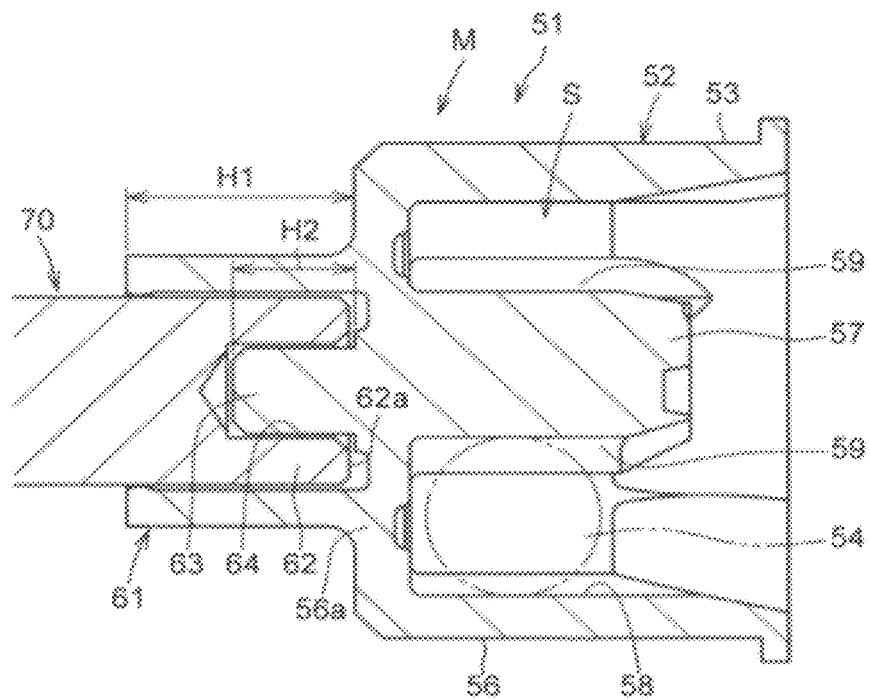
FIGS. 1A and 1B are cross sectional views of relevant portions of a driving force transmission mechanism of the present invention.
Figure 1B:
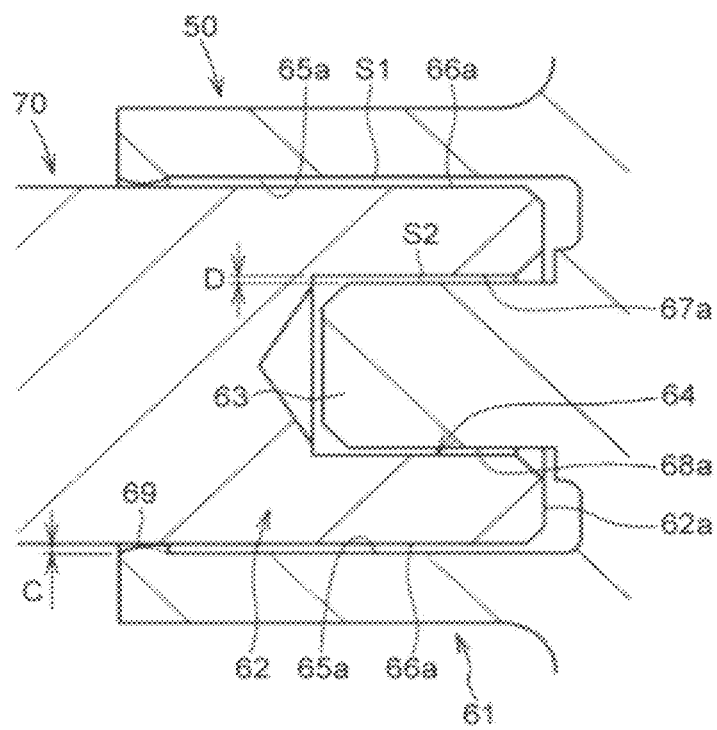
Figure 2:
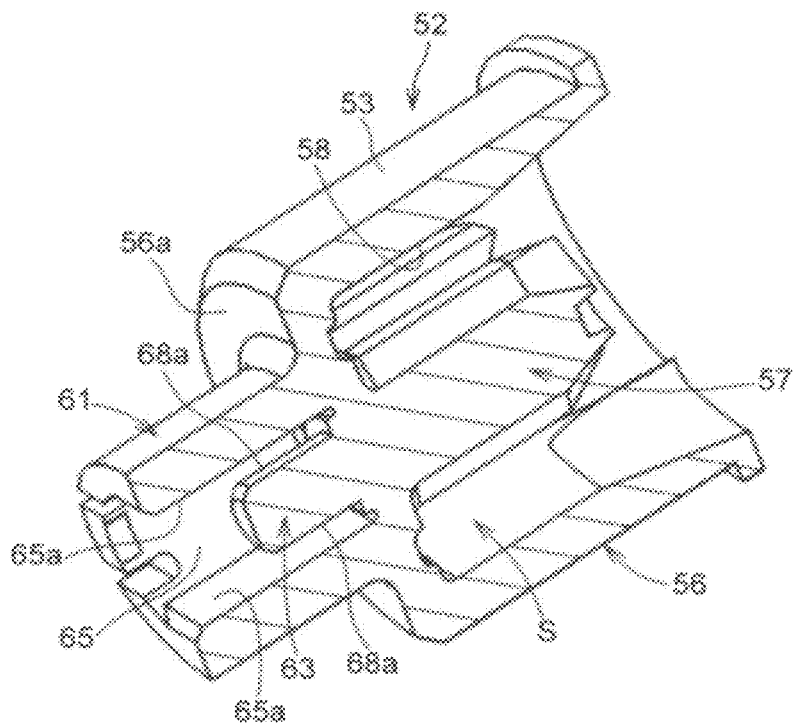
FIG. 2 is a half-cut cross sectional perspective view of relevant portions of the driving force transmission mechanism.
Figure 3:
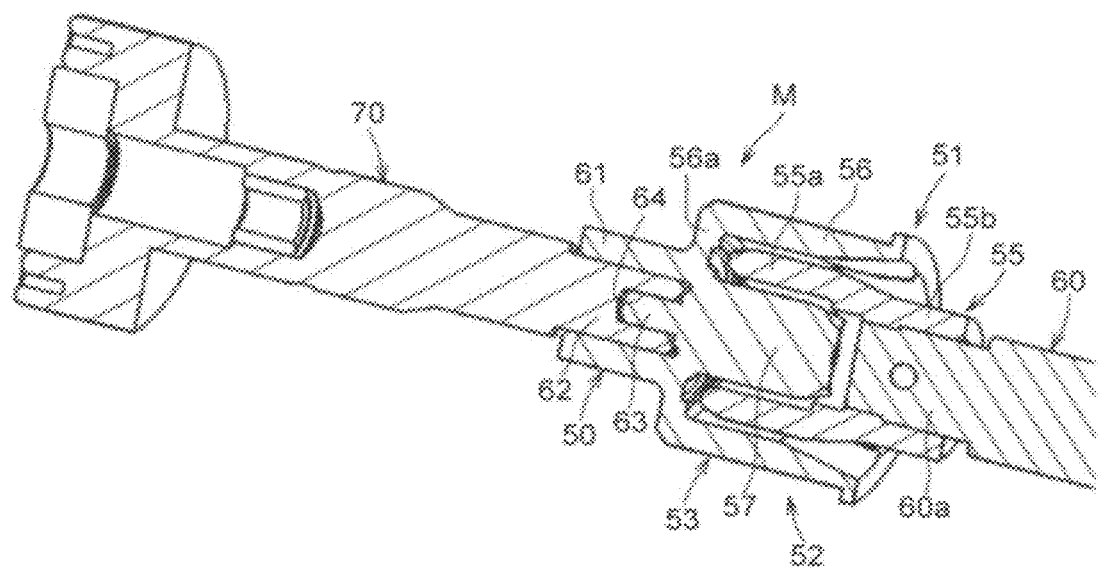
FIG. 3 is a cross sectional view of relevant portions of the driving force transmission mechanism in a coupled state.

An input shaft (a driven shaft) 70 for a developing roller (a rotary member) included in the developing unit 2 is coupled to an output shaft (a driving shaft) on the driving source side (not illustrated) via a driving force transmission mechanism M according to the embodiment (refer to FIGS. 1A to 3). The driving force transmission mechanism M includes a connection 50 for integrally rotating the output shaft on the driving source side and the input shaft 70 of the developing roller, and a driving force transmission unit 51 as illustrated in FIG. 3.

As the driving force transmission unit 51, a triball-type constant velocity joint 52 is used. The triball-type constant velocity joint 52 includes an outer ring 53 having an annular space S with one of its ends open, balls 54 provided inside the outer ring 53, and a cage 55 retaining the balls 54 as illustrated in FIG. 3.

The outer ring 53 includes a cylindrical cup portion 56, and an inner boss portion 57 projecting from a bottom portion 56a of the cup portion 56 toward inside the cup portion 56. Three track grooves 58 into which the balls 54 fit are formed in the inner periphery of the cup portion 56 at 120° angular intervals in the circumferential direction. Three track grooves 59 into which the balls 54 fit are formed in the outer periphery of the inner boss portion 57 at 120° angular intervals in the circumferential direction. The balls 54 are arranged between the track grooves 58 and 59 facing each other in the radial direction.

The cage 55 is a tubular body including a tubular base portion 55b into which an output end of an output shaft 60 on the driving source side fits and fixes, and a tubular leading edge portion 55a fitted into the annular space S of the outer ring 53 as illustrated in FIG. 3. The tubular leading edge portion 55a has the following gaps around: one between its outer periphery and the inner periphery of the cup portion 56 of the outer ring 53, another between its inner periphery and the outer periphery of the inner boss portion 57. The tubular leading edge portion 55a has pockets (not illustrated) at 120° angular intervals in the circumferential direction, each of which retains the ball 54.

This means that the constant velocity joint constitutes a sliding-type constant velocity universal joint in which angular positions and shaft directions are changed between two shafts. By using this, even if a deflection angle is generated between the output shaft on the driving source side and the input shaft 70 on the developing unit, the input shaft 70 on the developing unit side can be rotated at the same speed as that of the output shaft 60 on the driving source side while the deflection angle is maintained.

The connection 50 includes a tubular boss portion 61 provided in a projecting manner from the bottom portion 56a of the outer ring 53 in the constant velocity joint toward the input shaft 70 side, and a fitting shaft portion 62 fitted into the tubular boss portion 61. The fitting shaft portion 62 is constituted by a shaft end portion of the input shaft 70.

An inner shaft portion 63 is provided in a projecting manner in the outer surface center of the bottom portion 56a of the outer ring 53. An inner recessed portion 64 into which the inner shaft portion 63 fits is provided in the center of a leading edge plane 62a for fitting of the fitting shaft portion 62.

As illustrated in FIGS. 1A, 1B and 2, on the inner surface of the tubular boss portion 61, flat surface portions 65a are provided in positions opposed to each other by 180°, while on the outer surface of the fitting shaft portion 62, flat surface portions 66a corresponding to the flat surface portions 65a are provided. On the inner surface of the inner recessed portion 64, flat surface portions 67a are provided in positions opposed to each other by 180°, while on the outer surface of the inner shaft portion 63, flat surface portions 68a corresponding to the flat surface portions 67a are provided. H2 defined as the length (in a shaft direction) of the inner shaft portion 63 is shorter than H1 defined as the length (in a shaft direction) of the tubular boss portion 61, where H2 is nearly equal to H1/2.

A micro gap S1 is provided between the inner surface of the tubular boss portion 61 and the outer surface of the fitting shaft portion 62, while a micro gap S2 is provided between the inner surface of the inner recessed portion 64 and the outer surface of the inner shaft portion 63. When the size of the gap S1 between the inner surface of the tubular boss portion 61 and the outer surface of the fitting shaft portion 62 is defined as C, while the size of the gap S2 between the inner surface of the inner recessed portion 64 and the outer surface of the inner shaft portion 63 as D, C is nearly equal to D. A convex portion 69 projecting toward the inner diameter side is provided on the inner periphery at an opening of the tubular boss portion 61.

As described above, the micro gap S1 is provided between the inner surface of the tubular boss portion 61 and the outer surface of the fitting shaft portion 62, while the micro gap S2 is provided between the inner surface of the inner recessed portion 64 and the outer surface of the inner shaft portion 63. Here, for example, the tubular boss portion 61 and the fitting shaft portion 62 are moved in a direction perpendicular to the shaft direction between the inner surface of the tubular boss portion 61 and the outer surface of the fitting shaft portion 62 in order to increase the gap on the side opposed by 180° to the gap decreased when the inner surface of the tubular boss portion 61 comes closer to the outer surface of the fitting shaft portion 62. The gap, however, cannot be increased because the inner shaft portion 63 fits into the inner recessed portion 64. In contrast, in a conventional image forming apparatus without the inner recessed portion 64 or the inner shaft portion 63, such a gap on one side can be increased notably. As a result, shaft misalignment occurs in the conventional image forming apparatus without the inner recessed portion 64 or the inner shaft portion 63, while it hardly occurs in the image forming apparatus of the embodiment. In such a manner, the image forming apparatus of the embodiment hardly generates shaft misalignment to stably realize a rotational driving force transmission function with high accuracy, which allows the developing unit to form an image in an appropriate manner. This can prevent defects such as banding variation on an image to produce a high quality image.

With a driving force transmission unit M including the triball-type constant velocity joint, when a deflection angle is generated between the output shaft 60 on the driving source side and the input shaft 70 on the developing unit side, the input shaft 70 on the developing unit side can be rotated at the same speed as that of the output shaft 60 on the driving source side while the deflection angle is maintained, thereby forming a high quality image without defects such as uneven density.

The length of the inner shaft portion 63 is relatively short in the embodiment. If the length of the inner shaft portion 63 is increased, the backlash is effectively reduced because an angle generated while making the backlash becomes smaller.

Figure 9:
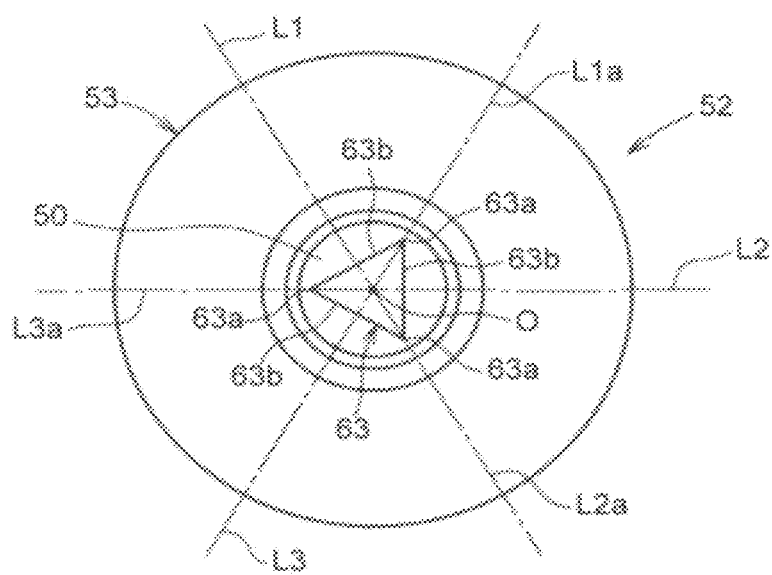
FIG. 9 is a front view of a triball-type constant velocity joint in which balls and three sides of an inner shaft portion are shifted by 60° in the circumference direction.

In the connection 50 in the embodiment, the flat surface portions 67a are provided on the inner surface of the inner recessed portion 64, while the flat surface portions 68a are provided on the outer surface of the inner shaft portion 63. Alternatively, the inner shaft portion 63 may be a triangular prism as illustrated in FIG. 9, where the inner recessed portion 64 is a triangular hole. In addition, the micro gap S2 is provided between three sides 63b, 63b, and 63b on the outer surfaces of the inner shaft portion 63 and the inner flat surface of the inner recessed portion 64.

Figure 8:
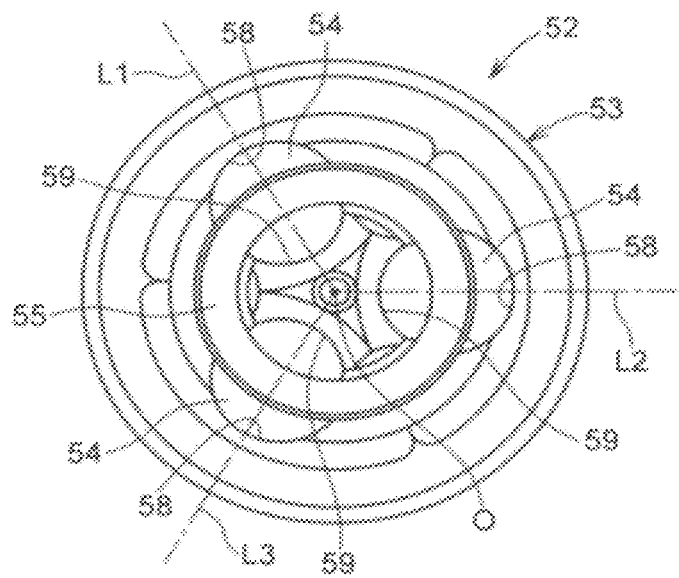
FIG. 8 is a front view of a triball-type constant velocity joint in which balls and three sides of an inner shaft portion are arranged to be in positions in a circumference direction.

When the inner shaft portion 63 is a triangular prism in this manner, each of the three sides 63a of the inner shaft portion 63 is aligned with positions in the circumferential direction where the three balls 54 are provided at 120° angular intervals in the circumferential direction as illustrated in FIG. 8. Specifically, the balls 54 and the sides 63a of the inner shaft portion 63 are arranged in the positions at 120° angular intervals around the joint shaft center O on radial direction lines L1, L2, and L3 along the circumferential direction as illustrated in FIG. 8.

In the example illustrated in FIG. 9, the three sides 63a of the inner shaft portion 63 are shifted by 60° in the circumferential direction with respect to the positions in the circumferential direction of the three balls 54 provided at 120° angular intervals in the circumferential direction. Accordingly, when the balls 54 are arranged on the radial direction lines L1, L2, and L3, the three sides 63a of the inner shaft portion 63 are arranged on radial direction lines L1a, L2a, and L3a shifted by 60° in the circumferential direction with respect to the radial direction lines L1, L2, and L3.

When the inner shaft portion 63 is a triangular prism while the inner recessed portion 64 is a triangular hole as described above, the same advantageous effects are obtained as the structure of the driving force transmission mechanism illustrated in FIGS. 1A and 1B. Furthermore, both the structure of the driving force transmission mechanism in which the three sides 63a of the inner shaft portion 63 are aligned with positions in the circumferential direction of the three balls 54 and the structure of the driving force transmission mechanism in which the three sides 63a of the inner shaft portion 63 are shifted by 60° in the circumferential direction can stably transmit a rotational force in a balanced manner.

Figure 10:
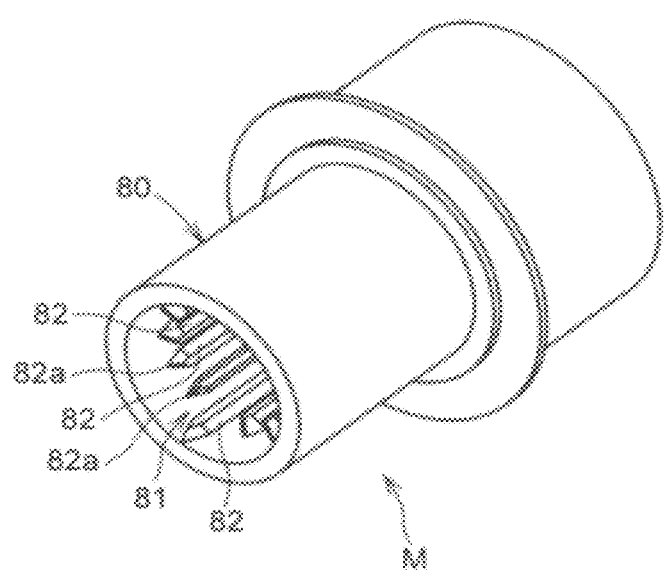
FIG. 10 is a perspective view of a driving force transmission unit with a spline fitting structure.
Figure 11A:
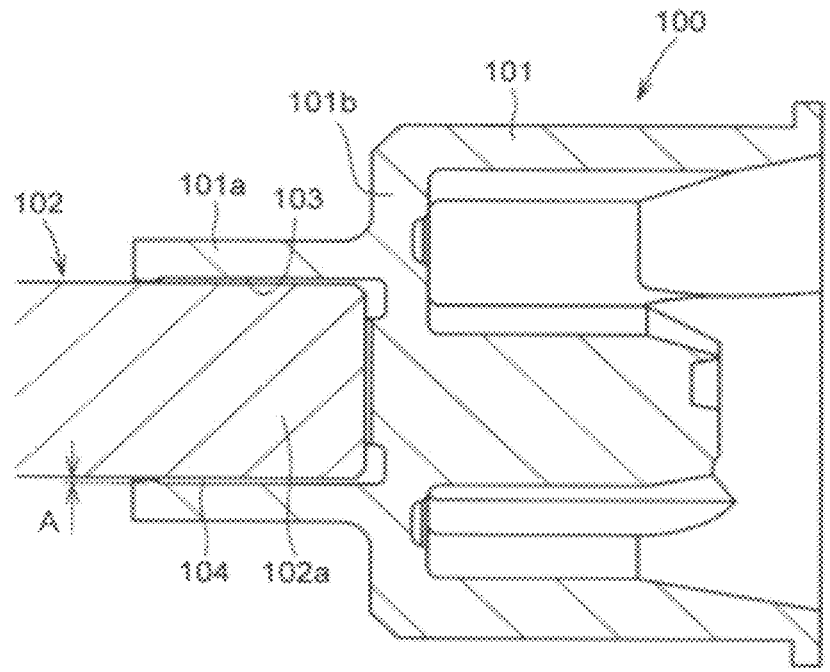
FIG. 11A is a cross sectional view of relevant portions of a driving force transmission mechanism in related art in a state before an inclination occurs.
Figure 11B:
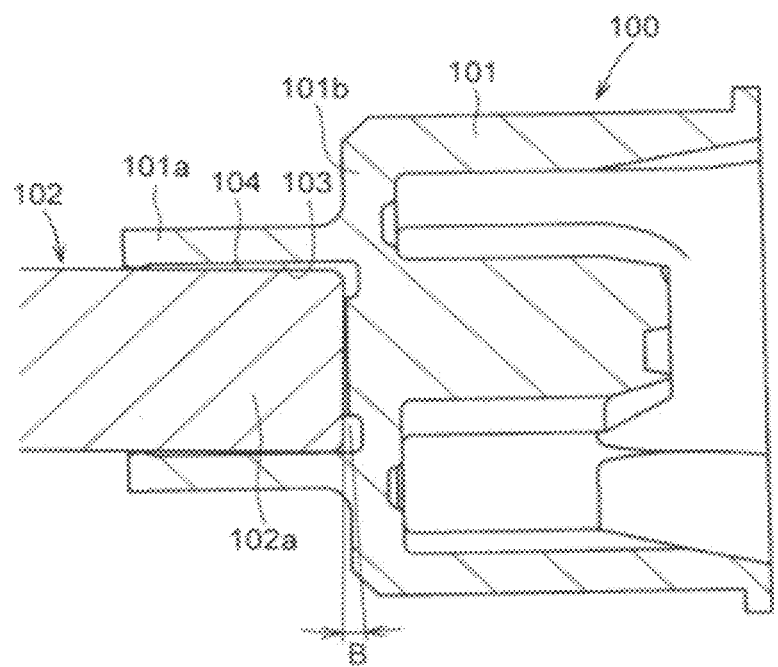
FIG. 11B is a cross sectional view of the relevant portions of the driving force transmission mechanism in related art in a state an inclination occurs.

Although the triball-type constant velocity joint 52 is used for the driving force transmission unit M in the above-described embodiment, a spline fitting may be used instead. Specifically, a male spline (an involute spline) is formed on the outer periphery of the shaft end portion of the output shaft 60 on the driving source side, while a female spline (an involute spline) 81 is formed on the inner periphery of a cylindrical body 80. The cylindrical body 80 is used to couple the output shaft 60 to the input shaft 70 via the connection 50 as illustrated in FIG. 3, for example. At a bottom wall of the cylindrical body 80, the tubular boss portion 61 and the inner shaft portion 63 are provided. The involute spline 81 may have an involute spline tooth 82 with its end 82a sharpened or with one involute spline tooth 82 extending in the thrust direction to form a shape for facilitating the male and female involute splines to guide each other as illustrated in FIG. 10, thereby improving attachability/detachability in the thrust direction.

When the driving force transmission unit M is constituted by means of a spline fitting, the driving force transmission unit M can be simplified to realize downsizing and cost reduction thereof.

In each of the process cartridge 30Y, 30C, 30M, and 30B of the embodiment and the image forming apparatus of the embodiment, the driving force transmission mechanism achieving the above-described advantageous effects can be used without change, thereby forming a high quality image.

It is to be understood that the present invention is not restricted to the embodiment described above. Various modifications and alternations can be added to the image forming apparatus without departing from the spirit and scope of the present invention. Examples of the image forming apparatus according to the present invention include an electrophotography copying machine, a laser-beam printer, and a facsimile machine. The micro gaps S1 and S2 can be changed as long as the "backlash" is set so that the fitting shaft portion 62 can be fitted into the tubular boss portion 61, the inner shaft portion 63 can be fitted into the inner recessed portion 64, meanwhile in these fitting statuses no defects such as banding variation on an image occur. The micro gaps S1 and S2 may be the same or different from each other. The inner shaft portion 63 may be a prism including four or more corners. When the inner shaft portion 63 is a prism including four or more corners, accordingly the inner recessed portion 64 is a hole portion including four or more corners. In addition, the fitting shaft portion 62 and the tubular boss portion 61 may be composed so that the fitting shaft portion 62 is a prism including three or more corners, while the tubular boss portion 61 is accordingly a hole portion including three or more corners. Furthermore, the fitting shaft portion 62 and the inner shaft portion 63 may be composed so that the cross sectional views thereof are oval or ellipse, while the tubular boss portion 61 and the inner recessed portion 64 are oval- or ellipse-shaped hole portions.

In the above-described embodiment, although an example in which the developing roller is used as the rotary member to which the rotational driving force from the driving source is transmitted has been described, any rotary member, such as a photosensitive drum, a transfer roller, and the like, used in an image forming apparatus can be used.

According to the driving force transmission mechanism of the embodiment, a rotational driving force transmission function can be stably realized with high accuracy, which allows the developing unit to form an image in an appropriate manner. This can prevent defects such as banding on an image due to pitch variation to produce a high quality image.

When the driving force transmission unit is constituted by means of the spline fitting, the driving force transmission unit can be simplified to realize downsizing and cost reduction thereof. When the driving force transmission unit is constituted by means of the triball-type constant velocity joint, if a deflection angle is generated between the output shaft on the driving source side and the input shaft on the developing unit side, the input shaft on the developing unit side can be rotated at the same speed as that of the output shaft on the driving source side while the deflection angle is maintained, thereby forming a high quality image without defects such as uneven density.

The inner shaft portion is formed in the triangular prism-shape and the inner recessed portion is formed in the triangular hole portion, thereby rotating the output shaft on the driving source side and the input shaft on the developing unit side integrally in a stable state.

According to the process cartridge of the embodiment and the image forming apparatus of the embodiment, the driving force transmission mechanism achieving the same advantageous effects as those described above can be used without change, thereby forming a high quality image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving force transmission mechanism that transmits rotational driving force from a driving source to a rotary member, the driving force transmission mechanism comprising:
   a connection for integrally rotating a driving shaft on the driving source side and a driven shaft of the rotary member;
   the connection including:
      a tubular boss portion; and
      a fitting shaft portion fitted into the tubular boss portion, wherein
   an inner shaft portion is provided in a projecting manner from bottom center of the tubular boss portion toward inside the tubular boss portion,
   an inner recessed portion into which the inner shaft portion fits is provided in center of a leading edge plane for fitting of the fitting shaft portion, and
   micro gaps are provided between an inner surface of the tubular boss portion and an outer surface of the fitting shaft portion and between an inner surface of the inner recessed portion and an outer surface of the inner shaft portion,
   the driving force transmission mechanism further comprising a driving force transmission unit provided between the driving shaft on the driving source side and the driven shaft of the rotary member,
   wherein:
   the driving force transmission unit includes a triball-type constant velocity joint, and a shaft and recessed joint,
   the inner shaft portion is a triangular shaft portion, the inner recessed portion is a triangular hole, and three sides of the inner shaft portion are aligned with positions in a circumferential direction of three balls as torque transmission materials of the triball-type constant velocity joint.

2. The driving force transmission mechanism according to claim 1, further comprising a driving force transmission unit provided between the driving shaft on the driving source side and the driven shaft of the rotary member, wherein the driving force transmission unit includes a spline fitting.

3. A process cartridge comprising:

a developing unit that includes a developing roller as the rotary member; and the driving force transmission mechanism according to claim 1.

4. An image forming apparatus comprising the process cartridge according to claim 3.

5. An image forming apparatus comprising:

a developing unit that includes a developing roller as the rotary member; and the driving force transmission mechanism according to claim 1.

6. A driving force transmission mechanism that transmits rotational driving force from a driving source to a rotary member, the driving force transmission mechanism comprising:

a connection for integrally rotating a driving shaft on the driving source side and a driven shaft of the rotary member;

the connection including:

a tubular boss portion; and a fitting shaft portion fitted into the tubular boss portion, wherein an inner shaft portion is provided in a projecting manner from bottom center of the tubular boss portion toward inside the tubular boss portion, an inner recessed portion into which the inner shaft portion fits is provided in center of a leading edge plane for fitting of the fitting shaft portion, and micro gaps are provided between an inner surface of the tubular boss portion and an outer surface of the fitting shaft portion and between an inner surface of the inner recessed portion and an outer surface of the inner shaft portion, the driving force transmission mechanism further comprising a driving force transmission unit provided between the driving shaft on the driving source side and the driven shaft of the rotary member, wherein:

the driving force transmission unit includes a triball-type constant velocity joint, and a shaft and recessed joint, the inner shaft portion is a triangular shaft portion, the inner recessed portion is a triangular hole, and three sides of the inner shaft portion are shifted by 60° along a circumferential direction with respect to positions in the circumferential direction of three balls as torque transmission materials of the triball-type constant velocity joint.

7. The driving force transmission mechanism according to claim 6, further comprising a driving force transmission unit provided between the driving shaft on the driving source side and the driven shaft of the rotary member, wherein the driving force transmission unit includes a spline fitting.

8. A process cartridge comprising:

a developing unit that includes a developing roller as the rotary member; and the driving force transmission mechanism according to claim 6.

9. An image forming apparatus comprising the process cartridge according to claim 8.

10. An image forming apparatus comprising:

a developing unit that includes a developing roller as the rotary member; and the driving force transmission mechanism according to claim 6.

* * * * *